United States Patent [19]

Fukuzaki et al.

[11] 4,263,654
[45] Apr. 21, 1981

[54] SYSTEM FOR DETERMINING THE NORMAL OPERATING VALUE OF POWER PLANT DATA

[75] Inventors: Takaharu Fukuzaki, Koganei; Toshio Kimura, Sagamihara, both of Japan

[73] Assignee: Hitachi, Ltd., Tokyo, Japan

[21] Appl. No.: 727,454

[22] Filed: Sep. 28, 1976

[51] Int. Cl.² ........................................... G21C 17/00
[52] U.S. Cl. ................................. 364/504; 176/19 R; 176/24; 364/107
[58] Field of Search ...................... 235/151, 21, 151.1, 235/195; 176/19 R, 20, 24; 340/146.2; 364/504, 492, 200, 900, 107, 418

[56] References Cited

U.S. PATENT DOCUMENTS

| 3,043,516 | 7/1962 | Abbott et al. ........................ 235/195 |
| 3,400,374 | 9/1968 | Schumann ........................... 364/418 |
| 3,755,659 | 8/1973 | Bolhuis ................................ 235/195 |
| 3,849,637 | 11/1974 | Caruso et al. ...................... 176/20 R |
| 3,889,106 | 6/1975 | Alliston et al. .................. 235/151.21 |
| 3,997,767 | 12/1976 | Torres et al. ......................... 176/24 |
| 4,000,037 | 12/1976 | Nusbaum et al. ................. 176/19 R |
| 4,115,848 | 9/1978 | Kogure et al. ....................... 364/900 |

*Primary Examiner*—Errol A. Krass
*Attorney, Agent, or Firm*—Craig and Antonelli

[57] ABSTRACT

A system for determining the normal operating value of at least one type of power plant data corresponding to the presently operating step of an operating plant first determines the present operation step of the plant, such as a nuclear power plant, by detecting at least one type of plant data, such as the reactor power, and then determines the normal value of at least one type of plant data, such as the main stream flow, the feedwater flow or the generator power in response to the presently determined operation step of the plant.

5 Claims, 6 Drawing Figures

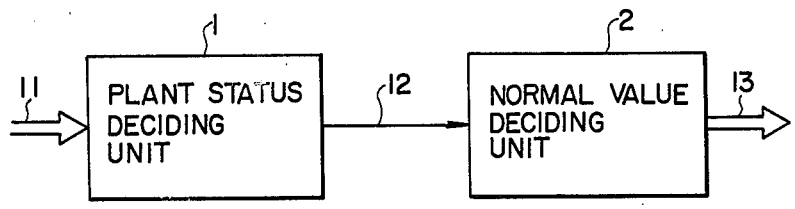
FIG. 1
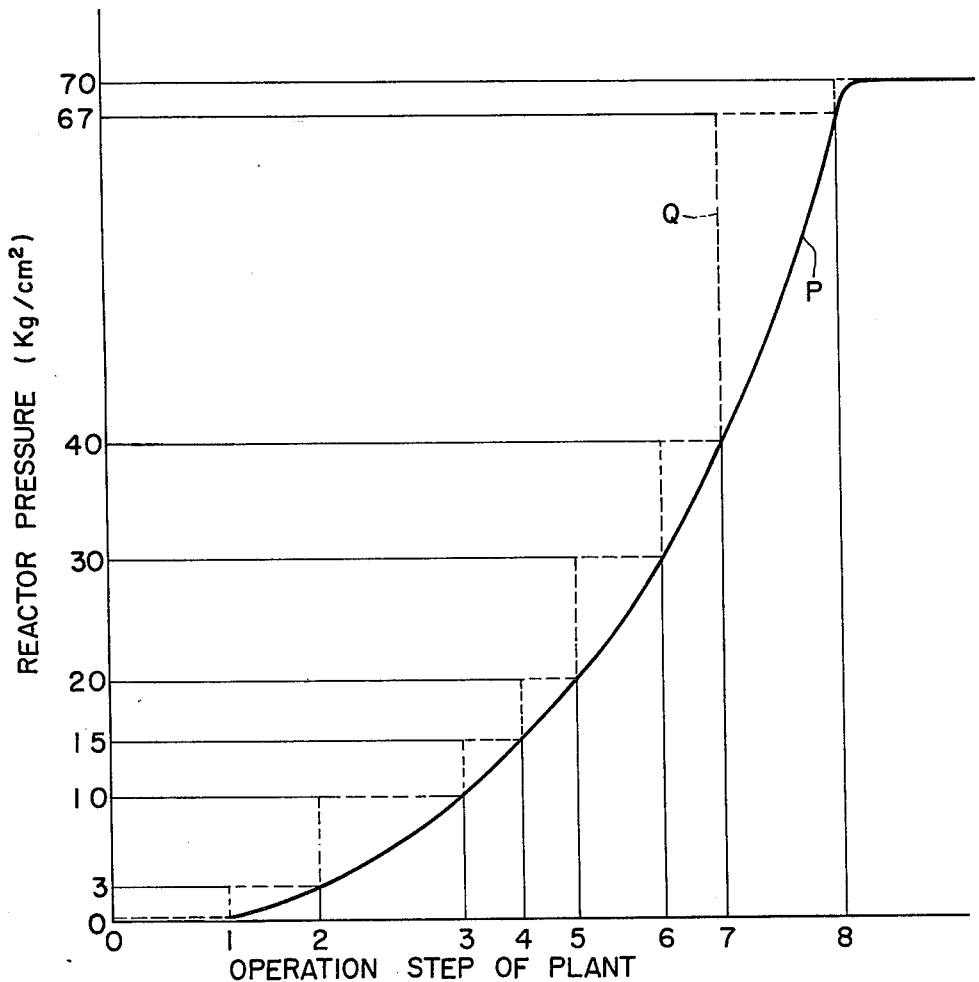
FIG. 2
FIG. 4
| ADDRESS | NORMAL VALUE |
|---------|--------------|
| 0 | 0 |
| 1 | 3 |
| 2 | 10 |
| 3 | 15 |
| 4 | 20 |
| 5 | 30 |
| 6 | 40 |
| 7 | 67 |
| 8 | 70 |

SYSTEM FOR DETERMINING THE NORMAL OPERATING VALUE OF POWER PLANT DATA

BACKGROUND OF THE INVENTION

The present invention relates to a system for determining normal operating values of plant data which sequentially change in the transient operational mode, for example, during the start-up or shut-down operation of a plant.

In order to determine whether or not a plant is operating normally, it is a required task for the plant operator to compare the present values of main plant data with their normal operating values. Especially, such a determination is important during any transient operational mode of the plant, since the plant status sometimes becomes unstable at such times.

In the transient operational mode, the values of the main plant data change broadly. For example, during the start-up operation of a nuclear power plant, plant data such as the reactor pressure, the reactor power, the main steam flow, and the feedwater flow are known to change in a range from 0 to 100 percent. Therefore, the operator of the plant must determine the normal values of plant data in response to the present plant status before making a comparison between the present values and the normal values. The normal value corresponds to a plant data operating value of the plant when the plant is properly operating during an operating step thereof. Even for the experienced operator, great effort and skill are required to determine the normal values of the plant data which are changing over such a wide range of values during the transient operational mode.

It is possible to determine the normal values of plant data by repeatedly analyzing the dynamic characteristic of the plant. However, such a method consumes considerable time and requires the use of rather complicated apparatus. It is, therefore, generally undesirable.

SUMMARY OF THE INVENTION

A main object of the present invention is to provide a system for determining the normal values of plant data in a reasonably short time and with apparatus of simple construction.

In order to achieve such an object, the present invention is characterized by provision of a system for determining the normal values of plant data which comprises first means for determining the present plant status in response to at least one type of plant data changing with the operation of the plant and second means for determining at least one normal value of plant data in response to the plant status derived from said first means.

BRIEF DESCRIPTION OF THE DRAWINGS

FIG. 1 is a schematic block diagram showing the fundamental construction of a normal value determining system according to the present invention.

FIG. 2 is a diagram showing the relationship between the operation steps of the plant and the reactor pressure.

FIG. 4 is a diagram showing the store status of the memory in FIG. 3.

DETAILED DESCRIPTION OF THE PREFERRED EMBODIMENTS

Figure 3:
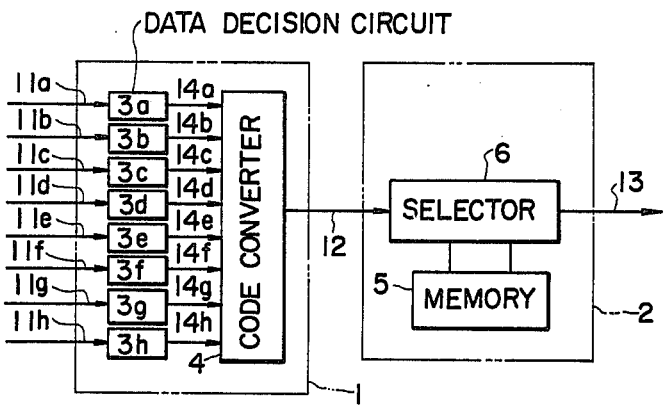
FIG. 3 is a block diagram showing an embodiment of a normal value determining system according to the present invention.

FIG. 1 shows the fundamental construction of a normal value determining system according to the present invention. In FIG. 1, numeral 1 indicates a plant status deciding unit, numeral 2 indicates a normal value deciding unit, numeral 11 designates the present value signal of at least one type of plant data (digital or analog data), numeral 12 designates a signal corresponding to the present operation status and numeral 13 designates the normal value signal of at least one type of plant data.

When one or more types of plant data represented by a signal or signals 11 are supplied to the plant status deciding unit 1, the present operation status of the plant is determined by comparing predetermined data values representing various operation steps with the plant data signal 11, and the signal 12 corresponding to the present operation step is supplied to the normal value deciding unit 2. One or more normal values are determined by the deciding unit 2 in response to the signal 12 from the deciding unit 1 and one or more signals 13 corresponding to the normal values are derived from the deciding unit 2.

Two exemplary embodiments of a specific construction of the normal value determining system shown in FIG. 1 will be explained for a system adapted for use in a nuclear power plant using a boiling water reactor (BWR).

The first embodiment relates to the situation in which a normal value of one type of plant data is determined on the basis of present values of a plurality of types of plant data. FIG. 2 illustrates the characteristic change of reactor pressure in the pressurization mode of operation during the start-up of the nuclear power plant. In this figure, the abscissa represents the different operation steps of the plant and the ordinate represents the reactor pressure. As seen from the drawing, the reactor pressure increases with the increase of step number, as shown by the solid line P.

The steps of various operations to be executed in the pressurization mode are predetermined on the basis of the reactor pressure in the pressurizaton mode. Therefore, the present normal value of the reactor pressure can be determined on the basis of the progress of the operation step. That is, the normal value such as shown along dotted line Q is obtained by detecting the change of data corresponding to the operation step. Although this value changes stepwise, it is a satisfying value to give to the operator.

FIG. 3 shows a schematic block diagram of the first embodiment of the present invention. In FIG. 3 numerals 11a to 11h indicate the present value signals of digital data, as shown in Table 1, numerals 3a to 3h data decision circuits for determining the status of the digital data 11a to 11h, respectively, numerals 14a to 14h signals representing the status of digital data, numeral 4 a code converter for producing a signal 12 corresponding to the operation status of the plant, numeral 5 a memory for storing a plurality of normal values of the reactor pressure, and numeral 6 a selector for selecting one normal value corresponding to the signal 12 from the memory 5 and for producing a normal value signal 13.

TABLE 1

| signal | classification of digital data | status |
| --- | --- | --- |
| 11a | reactor pressure vessel vent valve | closed |
| 11b | steam packing exhauster blower | ON |
| 11c | mechanical vacuum pump | OFF |
| 11d | clean-up auxiliary pump | OFF |
| 11e | feedwater pump | ON |
| 11f | clean-up recirculation pump | ON |
| 11g | direction by supervisor | OK |
| 11h | turbine turning motor | stopped |

The values of the digital data shown in the Table 1 change in response to the steps of the operation in the pressurization mode. These values of digital data are supplied to the data decision circuits 3a to 3h, which may be provided as simple comparator circuits, as signals 11a to 11h. It is determined by the data decision circuits 3a to 3h whether or not the present status represented by the digital data signals 11a to 11h coincide with the predetermined status shown in Table 1. In response to the presence or absence of such coincidence, a binary "1" or "0" signal, respectively, is produced as each of the signals 14a to 14h. For example, when the reactor pressure vessel vent valve is closed, a binary "1" signal is produced as the signal 14a.

In the code converter 4, which may be a simple digital summing circuit, a singal 12 corresponding to the present operation status of the plant is produced according to Table 2.

TABLE 2

| Signal 14 | | | | | | | | Signal 12 |
| --- | --- | --- | --- | --- | --- | --- | --- | --- |
| a | b | c | d | e | f | g | h | |
| 0 | 0 | 0 | 0 | 0 | 0 | 0 | 0 | 0 |
| 1 | 0 | 0 | 0 | 0 | 0 | 0 | 0 | 1 |
| 1 | 1 | 0 | 0 | 0 | 0 | 0 | 0 | 2 |
| 1 | 1 | 1 | 0 | 0 | 0 | 0 | 0 | 3 |
| 1 | 1 | 1 | 1 | 0 | 0 | 0 | 0 | 4 |
| 1 | 1 | 1 | 1 | 1 | 0 | 0 | 0 | 5 |
| 1 | 1 | 1 | 1 | 1 | 1 | 0 | 0 | 6 |
| 1 | 1 | 1 | 1 | 1 | 1 | 1 | 0 | 7 |
| 1 | 1 | 1 | 1 | 1 | 1 | 1 | 1 | 8 |

For example, when only signal 14a is "1" and other signals 14b to 14h are all "0", signal "1" is produced as the signal 12. This signal 12 is supplied to the selector 6 of the normal value deciding unit 2.

The normal values of the reactor pressure corresponding to respective operation steps of the plant have been stored at the respective addresses of the memory 5 corresponding to the values of signal 12, as shown in FIG. 4. The normal value of the reactor pressure is read out by the selector 6 from the address corresponding to the value of signal 12 and is outputted as a signal 13.

Although signals 11a to 11h are provided in digital form in the above-mentioned embodiment, analog data can be used for the signals 11a to 11h.

In FIG. 3, each of the data decision circuits 3a to 3h may be comprised of a register for storing the predetermined status of the corresponding plant data and a comparator for comparing the present status represented by each of the signals 11a to 11h with the predetermined status. The code converter is comprised of a converter for converting the combination of signals 14a to 14h to the corresponding signal 12. A general memory selecting circuit for reading out the information at the address corresponding to signal 12 can be used as the selector 6. A read only memory (ROM) can be used as the memory 5.

Figure 5:
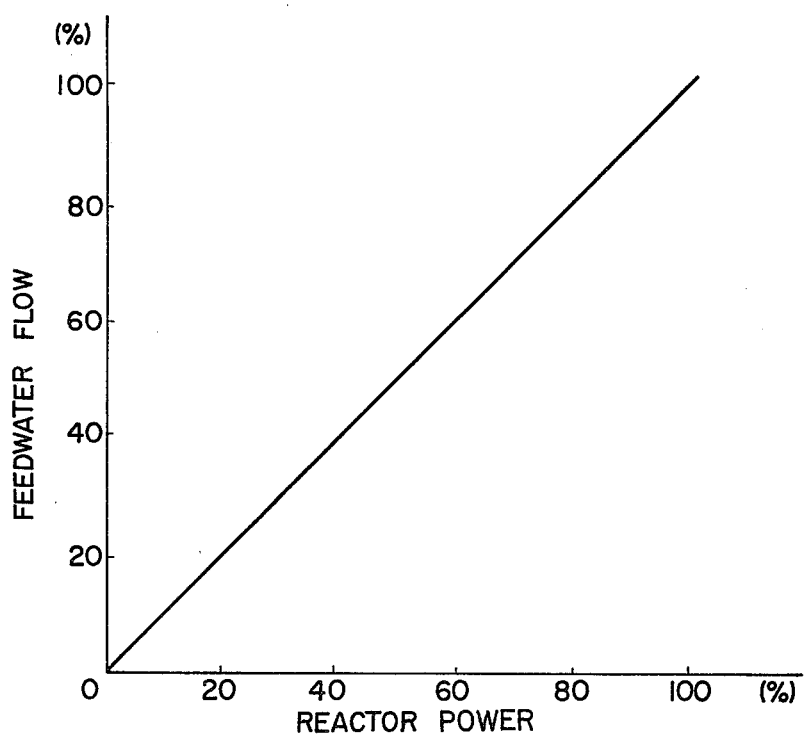
FIG. 5 is a diagram showing the relationship between the reactor power and the feedwater flow.

A second embodiment of the present invention relates to the situation in which the normal values of a plurality of types of plant data are determined on the basis of the present value of one type of plant data. FIG. 5 shows the relationship between the reactor power and the feedwater flow. As seen from FIG. 5, the feedwater flow changes in proportion to the reactor power during the power-up mode at the start-up of the nuclear power plant of the BWR type. In like manner, such plant data as the main steam flow and the generator power change in the same proportion to the rector power in the power-up mode. Therefore, if a ratio of the present value of the reactor power to the rated value thereof is obtained, the present normal value of the feedwater flow, the main steam flow and the generator power, can be obtained by multiplying the rated value of the plant data by the appropriate ratio.

Figure 6:
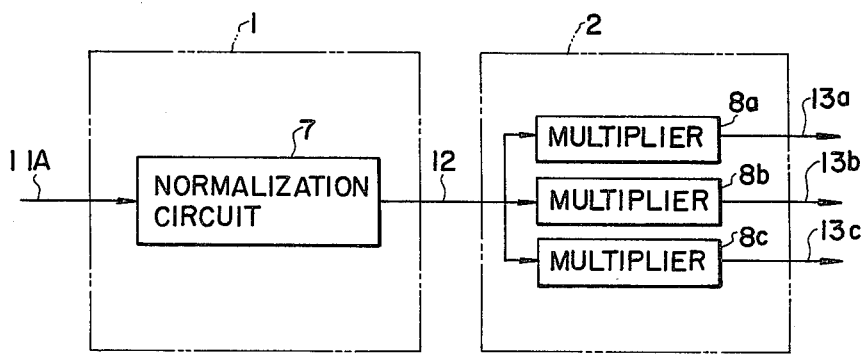
FIG. 6 is a block diagram showing another embodiment of a normal value determining system according to the present invention.

FIG. 6 shows a specific example of a system in accordance with this second embodiment of the invention. In the drawing numeral 7 indicates a normalization circuit for calculating the ratio of the present value of the signal 11A representing the reactor power to the rated value thereof and for outputting a signal 12 corresponding to the ratio of the values, and numerals 8a, 8b, 8c identify multipliers for multiplying the rated value of the main steam flow, the feedwater flow, and the generator power by the ratio corresponding to the signal 12.

In such construction, the present value of the reactor power is supplied as an analog signal 11A to the normalization device 7. A ratio of the present value 11A of the reactor power to the rated value thereof is calculated by the normalization device 7 and a signal 12 corresponding to the ratio is supplied to the multipliers 8a, 8b, and 8c. The rated values of the main steam flow, the feedwater flow and the generator power are multiplied by the ratio represented by signal 12. The normal values corresponding to the present operation step are thus obtained as signals 13a, 13b, and 13c.

Although the normal values of three types of plant data are obtained in the above-mentioned embodiment, the number of types of plant data is not limited thereto and may be one or more than one. In FIG. 6, the normalization device 7 can be comprised of a register for storing the rated value of the reactor power and a divider for calculating the ratio of the present value of the reactor power, represented by the signal 11A, to the rated value stored in the register.

Depending on the normal value determining system according to the present invention, the normal value of plant data which continuously changes in the transient operational mode can be determined by a system of simple construction and with high accuracy. By adding a display device, it is also possible to display the normal value of plant data.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A system for determining a value representing a normal operating value of at least one type of plant data corresponding to a presently operating step of an operating plant comprising first means for individually comparing signals representing the present status of a plurality of first types of plant data with signals representing the respective values for a predetermined status thereof and for producing respective output signals corresponding to the individual comparison results, second means for producing a signal corresponding to the present operation step of the plant in response to the signals produced by said first means, third means for storing various values representing normal operating values of at least one second type of plant data corresponding to the various operating steps of the plant, and fourth means for selecting the value representing the normal operating value of the at least one second type of plant data from the values stored by said third means in response to the signal produced by said second means and for producing at least one signal corresponding to the value representing normal operating value.

2. A system according to claim 1, in which the at least one second type of plant data to be determined is reactor pressure of the plant.

3. A system as defined in claim 1 wherein said first means includes a plurality of registers receiving said signals representing the present status of plant data, and a plurality of comparators each connected to a respective register and to a respective signal representing the values for a predetermined status.

4. A system for determining a value representing a normal operating value of at least one type of plant data corresponding to a presently operating step of an operating plant comprising first means for calculating the ratio of the present value of a first type of plant data to the rated value thereof and for producing a signal corresponding to the calculated ratio and indicative of a present operating step of the plant, and second means for multiplying the rated value of at least one second type of plant data by the ratio value derived from said first means and for producing at least one value signal corresponding to the multiplication result and representing the normal operating value of the at least one second type of plant data corresponding to the present operating step.

5. A system according to claim 4, in which said first type of plant data is reactor power and said second type of plant data includes at least one of main steam flow, feedwater flow, and generator power.

* * * * *